United States Patent [19]

Hosokawa et al.

[11] Patent Number: 6,017,974

[45] Date of Patent: Jan. 25, 2000

[54] ACTIVATION ENERGY BEAM CURABLE COATING COMPOSITION

[75] Inventors: Noritaka Hosokawa; Kazuhide Hayama, both of Yokkaichi, Japan

[73] Assignee: Mitsubishi Chemical Corporation, Japan

[21] Appl. No.: 09/053,519

[22] Filed: Apr. 2, 1998

[30] Foreign Application Priority Data

Apr. 3, 1997 [JP] Japan .................................... 9-085126

[51] Int. Cl.[7] ........................................................ C08J 3/28
[52] U.S. Cl. ............................ 522/99; 522/106; 522/172; 522/173
[58] Field of Search .............................. 522/99, 106, 172, 522/173

[56] References Cited

U.S. PATENT DOCUMENTS

| 4,987,180 | 1/1991 | Ohata et al. | 524/588 |
|---|---|---|---|
| 5,378,735 | 1/1995 | Hosokawa et al. | 528/26 |

FOREIGN PATENT DOCUMENTS

| 6-73305 | 3/1994 | Japan . |
|---|---|---|
| 6-136355 | 5/1994 | Japan . |
| 6-180859 | 6/1994 | Japan . |
| 8-283362 | 10/1996 | Japan . |

OTHER PUBLICATIONS

Derwent Publications Ltd., XP002069952 & JP 06 116 350 A, Apr. 26, 1994.

*Primary Examiner*—Melvyn I. Marquis
*Attorney, Agent, or Firm*—Nixon & Vanderhye

[57] ABSTRACT

An activation energy beam curable coating composition containing (A) a polymer having an organopolysiloxane unit and a quaternary ammonium salt unit and (B) a polyfunctional acrylate having 3 or more acryloyl groups in the molecule is disclosed. A film excellent in abrasion resistance, antistatic properties and transparency can be formed by applying the activation energy beam curable coating composition of the present invention to the surface of a material, and irradiating the coated surface with an activation energy beam.

20 Claims, No Drawings

ACTIVATION ENERGY BEAM CURABLE COATING COMPOSITION

FIELD OF THE INVENTION

The present invention relates to an activation energy beam curable coating composition which is cured upon irradiation with an activation energy beam to form a film excellent in abrasion resistance, antistatic properties and transparency.

RELATED ART

Plastic products, e.g., polycarbonate, polymethyl methacrylate, polyethylene terephthalate, vinyl chloride resin, ABS resin and cellulose acetate, are excellent in lightweight properties, processability and impact resistance, and thus find various uses such as container, instrument panel, packaging material and housing.

However, these plastic products are low in surface hardness, and easily scratched. Transparent resins such as polycarbonates involve the drawback that their inherent transparency or appearance is markedly impaired. These disadvantages make it difficult to use plastic products in a field requiring abrasion resistance.

Thus, there has been a demand for an activation energy beam curable hard coat material (coating material) which imparts abrasion resistance to the surface of these plastic products. However, a cured layer of the commercially available activation energy beam curable hard coat material has high surface resistivity, posing the serious defect that static electricity tends to occur. This static electricity may promote deposition of dust on the product, impairing the look and transparency of the product. To avoid these drawbacks, an activation energy beam curable coating material is desired which gives a film imparting abrasion resistance and antistatic properties to the surface of a plastic product.

As an activation energy beam curable resin coating material which gives a film possessing abrasion resistance, antistatic properties and transparency, a coating composition containing a copolymer having a quaternary ammonium salt and a polyfunctional (meth)acrylic ester, for example, has already been proposed (Japanese Unexamined Patent Publication Nos. 6-73305 and 6-180859). A film obtained from the coating materials described in these publications has surface resistivity (antistatic properties) at the level of $10^{10}$ to $10^{12}$ Ω. This level is sufficient for uses such as the instrument panel of an automobile, and a packaging material. However, it is insufficient for uses requiring higher antistatic properties ($10^8$ to $10^9$ Ω), including a housing of a computer or communications equipment, and a container for transportation of a precision member such as IC or LED. With the coating materials described in those publications, if the level of the antistatic properties of the film was to be raised, the relative amount of the copolymer having the quaternary ammonium salt in the coating composition had to be increased. In this case, the resulting film declined in abrasion resistance.

Under these circumstances, the present invention has it as an object to provide a coating composition which gives a film having sufficient antistatic properties and excellent abrasion resistance. Another object of the invention is to provide a coating composition which gives a film satisfactory in durability, including wet heat resistance and water resistance, and transparency, in addition to these properties. Still another object of the invention is to provide a material having a film satisfactory in antistatic properties, abrasion resistance, wet heat resistance, water resistance, and transparency.

SUMMARY OF THE INVENTION

To attain these objects, we, the inventors, have conducted extensive studies. As a result, we have found that a film having excellent antistatic properties and abrasion resistance can be formed by applying a composition containing a polymer having an organopolysiloxane unit and a quaternary ammonium salt unit and a polyfunctional acrylate to a surface of a material, and then irradiating the coated surface with an activation energy beam to cure the coating. This finding has led us to accomplish the present invention.

That is, the invention provides an activation energy beam curable coating composition containing (A) a polymer having an organopolysiloxane unit and a quaternary ammonium salt unit and (B) a polyfunctional acrylate having 3 or more acryloyl groups in the molecule. According to a preferred embodiment of the invention, the polymer (A) is a polymer having a (meth)acryloyl group in a side chain.

As preferred methods for producing the polymer (A), there are:

A method which comprises copolymerizing (a1) an organopolysiloxane compound having either one radical polymerizable group in one molecule, or two mercapto groups in one molecule, (a2) a tertiary amine compound having one radical polymerizable group in one molecule, and if desired, (a3) a (meth) acrylic ester to obtain a tertiary amine polymer compound, and then converting the tertiary amine polymer compound into a quaternary ammonium salt with a quaternizing agent;

A method which comprises copolymerizing (a1) an organopolysiloxane compound having either one radical polymerizable group in one molecule, or two mercapto groups in one molecule, (a4) a quaternary ammonium salt having one radical polymerizable group in one molecule, and if desired, (a3) a (meth)acrylic ester;

A method which comprises copolymerizing (a1) an organopolysiloxane compound having either one radical polymerizable group in one molecule, or two mercapto groups in one molecule, (a2) a tertiary amine compound having one radical polymerizable group in one molecule, and (a3) a (meth)acrylic ester having a functional group to obtain a copolymer, addition-reacting a compound having a (meth)acryloyl group with the copolymer to obtain a tertiary amine polymer compound, and then converting the tertiary amine polymer compound into a quaternary ammonium salt with a quaternizing agent; and A method which comprises copolymerizing (a1) an organopolysiloxane compound having either one radical polymerizable group in one molecule, or two mercapto groups in one molecule, (a4) a quaternary ammonium salt having one radical polymerizable group in one molecule, and a (meth)acrylic ester having a functional group to obtain a copolymer, and then addition-reacting a compound having a (meth)acryloyl group with the copolymer.

According to a preferred embodiment of the invention, the polyfunctional acrylate (B) is selected from the group consisting of dipentaerythritol hexaacrylate, dipentaerythritol pentaacrylate, and a carboxyl group-containing polyfunctional acrylate obtained by reacting a tetracarboxylic acid dianhydride with a hydroxyl group-containing polyfunctional acrylate having a hydroxyl group and 3 or more acryloyl groups in the molecule.

According to another preferred embodiment of the invention, the activation energy beam curable coating composition further contains (C) a polymerizable monomer such as an acrylate having 1 or 2 acryloyl groups in the molecule and/or (D) a photopolymerization initiator. Preferably, the activation energy beam curable coating composition of the invention contains 1 to 40% by weight of the polymer (A), 60 to 99% by weight of the polyfunctional acrylate (B), 0 to 20% by weight of the polymerizable monomer (C), and 0 to 10% by weight of the photopolymerization initiator (D). The activation energy beam curable coating composition of the invention may further contain one or more additives selected from the group consisting of an ultraviolet absorber, an ultraviolet stabilizer, an antioxidant, an anti-blocking agent, a slipping agent, and a leveling agent.

According to another aspect of the invention, the invention provides a material having a cured film which can be formed by applying the above-described activation energy beam curable coating composition to the surface of the material, and irradiating the coated surface with an activation energy beam.

DETAILED DESCRIPTION OF THE INVENTION

Preferred Embodiments

The activation energy beam curable coating composition of the present invention provides a film excellent in antistatic properties, transparency and abrasion resistance and satisfactory in durability such as wet heat resistance and water resistance.

The polymer (A) has antistatic properties, and is lifted to the surface of the resulting film because of the organopolysiloxane skeleton in the molecule. Thus, this polymer, even when incorporated in the same amount as in the earlier technologies, gives sufficient antistatic properties to the film, and does not decrease abrasion resistance. The polymer (A) is also decreased in hydrophilicity by its organopolysiloxane skeleton, so that its compatibility with the polyfunctional acrylate (B) is so high as to improve the transparency of the resulting film. Particularly when a polymer having a (meth) acryloyl group in a side chain is used as the component (A), a film with high water resistance is obtained.

The following is a further detailed description of the respective components and formulation of the activation energy beam curable coating composition of the invention:

Polymer (A) Having an Organopolysiloxane Unit and a Quaternary Ammonium Salt Unit The polymer (A) having an organopolysiloxane unit and a quaternary ammonium salt unit gives antistatic properties to the resulting film, and if desired, may have a (meth) acryloyl group in a side chain.

The polymer (A) is obtained by polymerizing (a1) an organopolysiloxane compound having either one radical polymerizable group in one molecule, or two mercapto groups in one molecule, with (a2) a tertiary amine compound having one radical polymerizable group in one molecule to obtain a tertiary amine polymer compound, and then converting the tertiary amine polymer compound into a quaternary ammonium salt with a quaternizing agent. When the organopolysiloxane compound (a1) is copolymerized with the tertiary amine compound (a2) having one radical polymerizable group in one molecule, other monomer, (a3) a (meth) acrylic ester, may be copolymerized in addition to these monomers.

The polymer (A) is also obtained by polymerizing (a1) an organopolysiloxane compound having either one radical polymerizable group in one molecule, or two mercapto groups in one molecule, with (a4) a quaternary ammonium salt having one radical polymerizable group in one molecule. When the organopolysiloxane compound (a1) is copolymerized with the quaternary ammonium salt (a4) having one radical polymerizable group in one molecule, other monomer, (a3) a (meth) acrylic ester, may be copolymerized in addition to these monomers.

The organopolysiloxane compound (a1) having one radical polymerizable group in one molecule is not restricted, as long as it has one radical polymerizable group, such as an acrylic, methacrylic, styryl, cinnamic ester, vinyl or allyl group, in one molecule. In view of the ease of copolymerization of this compound (a1) with the tertiary amine compound (a2) having a radical polymerizable group or the quaternary ammonium salt (a4) having a radical polymerizable group, however, the compound (a1) should preferably be an organopolysiloxane compound having a radical polymerizable group such as an acrylic, methacrylic or styryl group.

It is also possible to preferably use the organopolysiloxane compound (a1) having two mercapto groups in one molecule which is introduced into the polymer via sulfide bonds by chain transfer during polymerization of the tertiary amine compound (a2) having a radical polymerizable group or the quaternary ammonium salt (a4) having a radical polymerizable group.

The organopolysiloxane unit contained in any of these organopolysiloxane compounds (a1) preferably has a structure expressed by the following general formula (I):

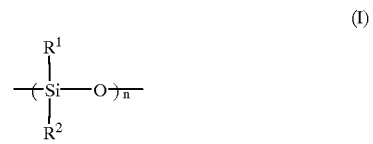

(I)

where $R^1$ and $R^2$ may be the same or different, and each represent a methyl group or a phenyl group, and n denotes an integer of 5 or more.

The number average molecular weight of the organopolysiloxane compound (a1) is 400 to 60,000, and preferably 1,000 to 30,000.

The tertiary amine compound (a2) having one radical polymerizable group in one molecule preferably has a structure expressed by the general formula (II):

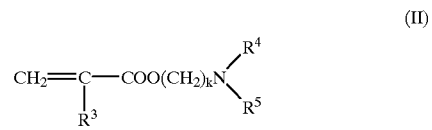

(II)

where $R^3$ represents H or $CH_3$, $R^4$ and $R^5$ each represent H or a $C_{1-9}$ alkyl group optionally containing a substituent, and k denotes an integer of 1 to 6.

Examples of the tertiary amine compound (a2) are N,N-dimethylaminoethyl (meth)acrylate, N,N-diethylaminoethyl (meth)acrylate, N,N-dimethylaminopropyl methacrylate, N,N-dimethylaminobutyl methacrylate, N,N-dihydroxyethylaminoethyl methacrylate, N,N-dipropylaminoethyl methacrylate, and N,N-dibutylaminoethyl methacrylate.

Examples of the (meth) acrylic ester (a3) are compounds having one radical polymerizable group in one molecule, such as methyl (meth)acrylate, ethyl (meth)acrylate, n-butyl (meth)acrylate, isobutyl (meth)acrylate, 2-ethylhexyl (meth) acrylate, benzyl (meth)acrylate, cyclohexyl (meth)acrylate, isobornyl (meth)acrylate, dicyclopentenyl (meth)acrylate, dicyclopentenyloxyethyl (meth)acrylate, ethoxyethyl (meth) acrylate, ethylcarbitol (meth)acrylate, butoxyethyl (meth)

acrylate, cyanoethyl (meth)acrylate, glycidyl (meth) acrylate, 2-hydroxyethyl (meth)acrylate, and 2-hydroxypropyl (meth)acrylate. When the organopolysiloxane compound (a1) is copolymerized with the tertiary amine compound (a2) or quaternary ammonium salt (a4) having one radical polymerizable group in one molecule, the (meth)acrylic ester (a3) may be used in addition to these monomers.

Examples of the quaternary ammonium salt (a4) having one radical polymerizable group in one molecule are the products prepared by quaternizing the tertiary amine compounds of the formula (II) with quaternizing agents such as alkyl chlorides (e.g., methyl chloride and butyl chloride), halides (e.g., methyl bromide, methylbenzyl chloride and benzyl chloride), alkylsulfuric acids (e.g., dimethyl-sulfuric acid, diethylsulfuric acid and dipropylsulfuric acid), and sulfonic esters (e.g., methyl p-toluenesulfonate and methyl benzenesulfonate).

When the organopolysiloxane compound (a1) is copolymerized with the tertiary amine compound (a2) or quaternary ammonium salt (a4) having one radical polymerizable group in one molecule, the amount of the organopolysiloxane compound (a1) used is 1 to 40% by weight, preferably 5 to 30% by weight, in 100% by weight of the copolymerizable monomers. If the amount of the organopolysiloxane compound (a1) is less than 1% by weight, there will be a lack of the capacity to withdraw the vinyl polymer onto the surface of the film (bleed out capacity), resulting in the failure to impart sufficient antistatic properties to the film. If this amount exceeds 40% by weight, there will be a decrease in the proportion of the tertiary amine compound (a2) or quaternary ammonium salt (a4) having one radical polymerizable group in one molecule. This will also fail in giving sufficient antistatic properties.

The amount used of the other component, the tertiary amine compound (a2) or quaternary ammonium salt (a4) having one radical polymerizable group in one molecule, is 60 to 99% by weight, preferably 70 to 95% by weight, in 100% by weight of the copolymerizable monomers. If its amount is less than 60% by weight, sufficient antistatic properties will not be given to the resulting film. If its amount exceeds 99% by weight, the proportion of the organopolysiloxane compound (a1) used will decrease, so that the film will not have sufficient antistatic properties.

The copolymerization of the monomers (a1), (a2), (a3) and (a4) will be performed in a solvent by the use of an ordinary radical polymerization initiator. Examples of the solvent are aromatic hydrocarbons such as toluene and xylene, esters such as ethyl acetate, propyl acetate and butyl acetate, alcohols such as methyl alcohol, ethyl alcohol, n-propyl alcohol, isopropyl alcohol and n-butyl alcohol, ketones such as acetone, methyl ethyl ketone, methyl isobutyl ketone and cyclohexanone, ethers such as 2-methoxyethanol, 2-ethoxyethanol, 2-butoxyethanol, ethylene glycol dimethyl ether, ethylene glycol diethyl ether, and diethylene glycol dimethyl ether, ether esters such as 2-methoxyethyl acetate, 2-ethoxyethyl acetate and 2-butoxyethyl acetate, and water. These solvents may be used as a mixture.

Preferred examples of the radical polymerization initiator for the polymerization reaction are organic peroxides such as benzoyl peroxide, di-t-butyl peroxide and cumene hydroperoxide, and azo compounds such as 2,2'-azobisisobutyronitrile, 2,2'-azobis-(2,4-dimethylvaleronitrile), and 2,2'-azobis(4-methoxy-2,4-dimethylvaleronitrile). The monomer concentration in the polymerization solution is usually 10 to 60% by weight, and the polymerization initiator is usually used in an amount of 0.1 to 10% by weight, preferably 0.3 to 2% by weight, based on the monomer mixture.

When the organopolysiloxane compound (a1), the tertiary amine compound (a2) having one radical polymerizable group in one molecule, and if desired, the (meth) acrylic ester (a3) have been copolymerized, the tertiary amine polymer compound obtained by copolymerization is converted into a quaternary ammonium salt with the use of a quaternizing agent. As the quaternizing agent, there can be used the quaternizing agents exemplified for the quaternization of the tertiary amine compounds expressed by the formula (II).

Of the polymers (A) having the organopolysiloxane unit and the quaternary ammonium salt unit obtained by the above-described method, the particularly desired one is a polymer obtained by copolymerizing the organopolysiloxane compound (a1) having either one radical polymerizable group in one molecule, or two mercapto groups in one molecule, the tertiary amine compound (a2) having one radical polymerizable group in one molecule, and if desired, the (meth) acrylic ester (a3) to obtain a tertiary amine polymer compound, and then converting the tertiary amine polymer compound into a quaternary ammonium salt with the use of an alkyl chloride. This is because this polymer is highly compatible with the polyfunctional acrylate having 3 or more acryloyl groups in the molecule, thus giving a highly transparent film.

When a polymer having an organopolysiloxane unit and a quaternary ammonium salt unit and having a (meth) acryloyl group in the side chain is used as the polymer (A) having the organopolysiloxane unit and the quaternary ammonium salt unit, bonds are formed between this polymer (A) and the polyfunctional acrylate (B) upon irradiation with an activation energy beam, whereby the durability of antistatic performance can be enhanced.

The polymer (A) having a (meth) acryloyl group in a side chain of a polymer having an organopolysiloxane unit and a quaternary ammonium salt unit is obtained in the following manner: When the organopolysiloxane compound (a1) is copolymerized with the tertiary amine compound (a2) or quaternary ammonium salt (a4) having one radical polymerizable group in one molecule, a (meth)acrylic ester having a functional group such as glycidyl (meth)acrylate is caused to participate in the copolymerization in addition to these monomers. Then, (meth)acrylic acid is addition-reacted with the resulting copolymer. When the tertiary amine compound (a2) is used, the resulting tertiary amine polymer compound is further converted into a quaternary ammonium salt by the use of a quaternizing agent.

Alternatively, the polymer (A) having a (meth)acryloyl group in a side chain of a polymer having an organopolysiloxane unit and a quaternary ammonium salt unit is obtained in the following manner: When the organopolysiloxane compound (a1) is copolymerized with the tertiary amine compound (a2) or quaternary ammonium salt (a4) having one radical polymerizable group in one molecule, a (meth) acrylate having a hydroxyl group, such as hydroxyethyl (meth)acrylate or hydroxypropyl (meth) acrylate, is caused to participate in the copolymerization in addition to these monomers. This copolymerization is followed by an addition reaction for adding a 1:1 (mole ratio) adduct of a (meth)acrylate having a hydroxyl group, such as hydroxyethyl (meth)acrylate, hydroxypropyl (meth) acrylate, pentaerythritol triacrylate or dipentaerythritol pentaacrylate, and an isocyanate compound such as tolylene diisocyanate, isophorone diisocyanate or hexamethylene diisocyanate; or adding methacryloyl isocyanate or 2-methacryloyloxyethyl isocyanate. When the tertiary amine compound (a2) is used, the resulting tertiary amine polymer compound is further converted into a quaternary ammonium salt by the use of a quaternizing agent.

Of the polymers (A) having the organopolysiloxane unit and the quaternary ammonium salt unit and having the (meth) acryloyl group in the side chain that have been obtained by the above-described method, the particularly desired one is the polymer (A) obtained by copolymerizing the organopolysiloxane compound (a1) having either one radical polymerizable group in one molecule, or two mercapto groups in one molecule, the tertiary amine compound (a2) having one radical polymerizable group in one molecule, and a (meth)acrylic ester having a functional group to obtain a copolymer, then addition-reacting a compound having a (meth)acryloyl group with the copolymer, and then converting the resulting tertiary amine compound into a quaternary ammonium salt with the use of an alkyl chloride. This is because this polymer (A) is highly compatible with the polyfunctional acrylate (B) having 3 or more acryloyl groups in the molecule, thus giving a highly transparent coating.

Polyfunctional Acrylate (B)

Examples of the polyfunctional acrylate (B) having 3 or more acryloyl groups in the molecule are trimethylolpropane triacrylate, ethylene oxide modified trimethylolpropane triacrylate, propylene oxide modified trimethylolpropane triacrylate, tris(acryloxyethyl) isocyanurate, caprolactone modified tris(acryloxyethyl) isocyanurate, pentaerythritol triacrylate, pentaerythritol tetraacrylate, dipentaerythritol tetraacrylate, dipentaerythritol pentaacrylate, dipentaerythritol hexaacrylate, alkyl modified dipentaerythritol triacrylate, alkyl modified dipentaerythritol tetraacrylate, alkyl modified dipentaerythritol pentaacrylate, and caprolactone modified dipentaerythritol hexaacrylate. Also usable is a carboxyl group-containing polyfunctional acrylate obtained by reacting a tetracarboxylic acid dianhydride with a hydroxyl group-containing polyfunctional acrylate having a hydroxyl group and 3 or more acryloyl groups in the molecule. These polyfunctional acrylates may be used in combination of two or more.

Examples of the tetracarboxylic acid dianhydride are pyromellitic acid dianhydride, 3,3',4,4'-benzophenonetetracarboxylic acid dianhydride, 4,4'-biphthalic acid anhydride, 4,4'-oxodiphthalic acid anhydride, 4,4'-(hexafluoroisopropylidene)diphthalic acid anhydride, 1,2,3,4-cyclopentanetetracarboxylic acid dianhydride, 5-(2,5-dioxotetrahydrofuryl)-3-methyl-3-cyclohexene-1,2-dicarboxylic acid anhydride, 4-(2,5-dioxotetrahydrofuran-3-yl)-tetralin-1,2-dicarboxylic acid anhydride, 3,4,9,10-perylenetetracarboxylic acid dianhydride, and bicyclo-[2.2.2]oct-7-ene-2,3,5,6-tetracarboxylic acid dianhydride.

Examples of the hydroxyl group-containing polyfunctional acrylate having a hydroxyl group and 3 or more acryloyl groups in the molecule are pentaerythritol triacrylate, dipentaerythritol tetraacrylate, dipentaerythritol pentaacrylate, and mixtures of these.

Of the polyfunctional acrylates having 3 or more acryloyl groups in the molecule, the particularly desired ones are dipentaerythritol hexaacrylate; dipentaerythritol pentaacrylate; carboxyl group-containing polyfunctional acrylates obtained by reacting tetracarboxylic acid dianhydrides with hydroxyl group-containing polyfunctional acrylates having a hydroxyl group and 3 or more acryloyl groups in the molecule; and mixtures of these acrylates. This is because these polyfunctional acrylates give a film with excellent abrasion resistance.

Optional Components

In addition to the polymer (A) having an organopolysiloxane unit and a quaternary ammonium salt unit and the polyfunctional acrylate (B) having 3 or more acryloyl groups in the molecule, it is optional to use another polymerizable monomer (C), e.g., an acrylate having 1 or 2 acryloyl groups in the molecule. Concretely, a urethane acrylate or epoxy acrylate having 2 acryloyl groups may be used in a range in which abrasion resistance or antistatic properties will not decline (i.e., in an amount of 20% by weight based on the film components).

When ultraviolet radiation is used as the activation energy beam for the curing of the coating composition, a photopolymerization initiator is used in addition to the polymer having an organopolysiloxane unit and a quaternary ammonium salt unit and the polyfunctional acrylate having 3 or more acryloyl groups in the molecule. Examples of the photopolymerization initiator are benzoin methyl ether, benzoin ethyl ether, benzoin isopropyl ether, benzoin butyl ether, diethoxyacetophenone, benzyldimethylketal, 2-hydroxy-2-methylpropiophenone, 1-hydroxycyclohexyl phenyl ketone, benzophenone, 2,4,6-trimethylbenzoindiphenylphosphine oxide, 2-methyl-[4-(methylthio)phenyl]-2-morpholino-1-propanone, 2-benzyl-2-dimethylamino-1-(4-morpholinophenyl)-butan-1-one, Michler's ketone, isoamyl N,N'-dimethylaminobenzoate, 2-chlorothioxanthone, and 2,4-diethylthioxanthone. These photopolymerization initiators may be used in a suitable combination of two or more.

With the activation energy beam curable coating composition of the invention, various additives to be incorporated in this type of composition may be incorporated in order to upgrade the properties of the resulting film. Examples of the additives are ultraviolet absorbers (e.g., benzotriazole, benzophenone, salicylate, and cyanoacrylate derived ultraviolet absorbers), ultraviolet stabilizers (e.g., hindered amine derived ultraviolet stabilizers), antioxidants (e.g., phenol, sulfur and phosphorus derived antioxidants), antiblocking agents, slipping agents, and leveling agents. Any of the additives may be incorporated in an amount of 0.01 to 2% by weight into the formulation for film formation.

Furthermore, it is permissible to use the same substance as the solvent used in viscosity adjustment of the coating composition and the preparation of the polymer.

Coating Composition

The amount used of the polymer (A) having an organopolysiloxane unit and a quaternary ammonium salt unit is 1 to 40% by weight, preferably 5 to 25% by weight, in 100% by weight of the solid components for film formation, excluding the solvent. If its amount is less than 1% by weight, a film having sufficient antistatic properties will not be obtained. If the amount exceeds 40% by weight, the abrasion resistance of the film will decline.

The amount used of the polyfunctional acrylate (B) having 3 or more acryloyl groups in the molecule is 60 to 99% by weight, preferably 75 to 95% by weight, in 100% by weight of the solid components for film formation, excluding the solvent. If its amount is less than 60% by weight, a film having sufficient abrasion resistance will not be obtained. If the amount exceeds 99% by weight, a film having sufficient antistatic properties will not be obtained.

The polymerizable monomer (C) other than the components (A) and (B) is used in an amount of 20% by weight or less, preferably 3 to 10% by weight, based on the solid components for film formation in an attempt to adjust the viscosity of the composition and impart flexibility to the resulting film.

The photopolymerization initiator is used in an amount of 10% by weight or less, preferably 1 to 5% by weight, based on the sum of the amounts of the polymerizable components (A), (B) and (C).

The coating composition of the invention is coated on a plastic base, such as polycarbonate, polymethyl methacrylate, polyethylene terephthalate, polyamide, vinyl chloride resin or ABS resin, by dipping, flow coating, spraying, bar coating, or a coating method using a coating instrument, such as gravure coating, roll coating, blade coating or air knife coating, in such a manner that after solvent drying and activation energy beam irradiation, a film with a thickness of 1 to 50 μm. preferably 1 to 20 μm, will be obtained on the surface of the plastic base.

Then, the coated surface is irradiated with an activation energy beam such as ultraviolet radiation from a light source, e.g., xenon lamp, low pressure mercury lamp, high pressure mercury lamp, ultrahigh pressure mercury lamp, metal halide lamp, carbon arc lamp or tungsten lamp, or electron beam, α radiation, β radiation or γ radiation taken out of a particle accelerator usually of 20 to 2,000 kV, in order to crosslink and cure the coating composition layer applied. Thereby, the coated layer is cured to form a film.

The surface resistivity of this film is at the level of $10^8$ to $10^9$ Ω, and rich in transparency and abrasion resistance.

EXAMPLES

The present invention will be described in further detail by reference to the Synthesis Examples and the Examples given below. The components, proportions and procedure described therein may be changed or modified, where necessary, unless the changes or modifications depart from the spirit and scope of the invention. Therefore, the scope of the invention is not restricted by these Examples. The parts and % disclosed in these Examples refer to the parts by weight and % by weight, respectively.

Synthesis Example 1
Synthesis of a Polymer Having an Organopolysiloxane Unit and a Quaternary Ammonium Salt Unit A mixture of 30 parts of an organopolysiloxane compound with a number average molecular weight of 11,300 having a styrene group at one end (X-22-2440, Shin-Etsu Chemical Co., Ltd.), 70 parts of N,N-dimethylaminoethyl methacrylate, and 150 parts of isopropyl alcohol was heated. When the mixture reached 80° C., and 2 hours after the mixture reached 80° C., 0.3 part each of azobisisobutyronitrile was added. The mixture was further reacted for 8 hours at 80° C. to obtain a copolymer solution with a solids content of 40%.

Then, 83.3 parts of isopropyl alcohol was added to the resulting copolymer solution, whereafter methyl chloride was introduced into the reaction system. The system was reacted for 6 hours at 50° C. to obtain a solution of polymer [I] (solids content 34%) having an organopolysiloxane unit and a quaternary ammonium salt unit.

Synthesis Example 2
Synthesis of a Polymer Having an Organopolysiloxane Unit and a Quaternary Ammonium Salt Unit A mixture of 10 parts of an organopolysiloxane compound with a number average molecular weight of 3,340 having mercapto groups at both ends (X-22-167B, Shin-Etsu Chemical Co., Ltd.), 80 parts of N,N-dimethylaminoethyl methacrylate, 10 parts of methyl methacrylate, and 150 parts of isopropyl alcohol was heated. When the mixture reached 80° C., and 2 hours after the mixture reached 80° C., 0.3 part each of azobisisobutyronitrile was added. The mixture was further reacted for 8 hours at 80° C. to obtain a copolymer solution with a solids content of 40%.

Then, 83.3 parts of isopropyl alcohol was added to the resulting copolymer solution, whereafter methyl chloride was introduced into the reaction system. The system was reacted for 6 hours at 50° C. to obtain a solution of polymer [II] (solids content 35%) having an organopolysiloxane unit and a quaternary ammonium salt unit.

Synthesis Example 3
Synthesis of a Polymer Having an Organopolysiloxane Unit and a Quaternary Ammonium Salt Unit A mixture of 15 parts of an organopolysiloxane compound with a number average molecular weight of about 10,000 having a methacryloyl group at one end (FM0725, Chisso Co., Ltd.), 75 parts of N,N-dimethylaminoethyl methacrylate, 10 parts of hydroxyethyl methacrylate, and 150 parts of methyl ethyl ketone was heated. When the mixture reached 80° C., and 2 hours after the mixture reached 80° C., 0.3 part each of azobisisobutyronitrile was added. The mixture was further reacted for 8 hours at 80° C. to obtain a copolymer solution with a solids content of 40%. To this solution, 8 parts of methacryloyl isocyanate was added. The mixture was reacted for 6 hours at 80° C. (disappearance of the absorption of an isocyanate group at 2250 cm$^{-1}$ was confirmed by infrared absorption spectrum) to obtain a copolymer solution with a solids content of 42% having a methacryloyl group in the side chain.

Then, 300 parts of isopropyl alcohol was added to the resulting copolymer solution, whereafter methyl chloride was introduced into the reaction system. The system was reacted for 6 hours at 50° C. to obtain a solution of polymer [III] (solids content 22%) having an organopolysiloxane unit and a quaternary ammonium salt unit and having a methacryloyl group in the side chain.

Synthesis Example 4
Synthesis of a Polymer Having an Organopolysiloxane Unit and a Quaternary Ammonium Salt Unit A mixture of 10 parts of an organopolysiloxane compound having a styrene group at one end (X-22-2440, Shin-Etsu Chemical Co., Ltd.), 80 parts of N,N-dimethylaminoethyl methacrylate, 10 parts of hydroxyethyl methacrylate, and 150 parts of methyl ethyl ketone was heated. When the mixture reached 80° C., and 2 hours after the mixture reached 80° C., 0.3 part each of azobisisobutyronitrile was added. The mixture was further reacted for 8 hours at 80° C. to obtain a copolymer solution with a solids content of 40%. To this solution, 50 parts of a compound obtained by reacting 28 parts of isophorone diisocyanate with 22 parts of 2-hydroxyethyl acrylate was added. The mixture was reacted for 6 hours at 80° C. (disappearance of the absorption of an isocyanate group at 2250 cm$^{-1}$ was confirmed by infrared absorption spectrum) to obtain a copolymer solution with a solids content of 50% having an acryloyl group in the side chain.

To this copolymer solution, 300 parts of isopropyl alcohol was added, whereafter methyl chloride was introduced into the reaction system. The system was reacted for 6 hours at 50° C. to obtain a solution of polymer [IV] (solids content 28%) having an organopolysiloxane unit and a quaternary ammonium salt unit and having an acryloyl group in the side chain.

Synthesis Example 5
Synthesis of a Polymer Having a Quaternary Ammonium Salt Unit, but not an Organopolysiloxane Unit A mixture of 80 parts of N,N-dimethylaminoethyl methacrylate, 20 parts of methyl methacrylate, and 150 parts of isopropyl alcohol was heated. When the mixture reached 80° C., and 2 hours after the mixture reached 80° C., 0.3 part each of azobisisobutyronitrile was added. The mixture was further reacted for 8 hours at 80° C. to obtain a copolymer solution with a solids content of 40%.

Then, 83.3 parts of isopropyl alcohol was added to the resulting copolymer solution, whereafter methyl chloride was introduced into the reaction system. The system was reacted for 6 hours at 50° C. to obtain a solution of polymer [V] (solids content 34%) having a quaternary ammonium salt unit.

Synthesis Example 6
Synthesis of a Polymer Having an Organopolysiloxane Unit, but not a Quaternary Ammonium Salt Unit A mixture of 30 parts of an organopolysiloxane compound having a styrene group at one end (X-22-2440, Shin-Etsu Chemical Co., Ltd.), 70 parts of methyl methacrylate, and 150 parts of isopropyl alcohol was heated. When the mixture reached 80° C., and 2 hours after the mixture reached 80° C., 0.3 part each of azobisisobutyronitrile was added. The mixture was further reacted for 8 hours at 80° C. to obtain a solution of polymer [VI] (solids content 40%) having an organopolysiloxane unit.

Synthesis Example 7
Synthesis of a Carboxyl Group-containing Polyfunctional Acrylate To 163 parts of a mixture of dipentaerythritol hexaacrylate and dipentaerythritol pentaacrylate containing 67 mol % of dipentaerythritol pentaacrylate (Kayarad DPHA with a hydroxyl number of 69 mg KOH/g, NIPPON KAYAKU, CO., LTD.), 21.8 parts of pyromellitic acid dianhydride, 100 parts of methyl ethyl ketone, 0.1 part of hydroquinone monomethyl ether, and 1 part of N,N-dimethylbenzylamine were added. The system was reacted for 8 hours at 80° C. to obtain a solution of a carboxyl group-containing polyfunctional acrylate [VII] (solids content 65%).

Examples 1 to 10
Production of Activation Energy Beam Curable Coating Compositions One of the polymers [I] to [VI], a polyfunctional acrylate, a photopolymerization initiator, and a solvent were blended uniformly in the proportions shown in Table 1 to prepare activation energy beam curable coating compositions (Examples 1 to 10 and Comparative Examples 1 and 2).

Each of the activation energy beam curable coating compositions was coated on a transparent (haze value 3.0%), 100 μm thick biaxially stretched polyethylene terephthalate film (T100E, Diafoil Hoechst) to a dry coating thickness of 6 μm by means of a bar coater, and then heat-dried for 2 minutes at 80° C. The coated film was fixed at a position 10 cm below a light source, a high pressure mercury lamp with a power density of 120 w/cm, and irradiated with ultraviolet radiation at 1,000 mJ/cm$^2$ to form a coating.

Each film with the coating was allowed to stand for 24 hours in a constant temperature chamber at 23° C. and a relative humidity of 60%. Then, the surface resistivity of the film was measured over 1 minute at an applied voltage of 100 V by TR-8601 (a product of Takeda Riken Co., Ltd.). The transparency of each coating was evaluated based on the haze value (H %) according to JIS K-7105. Furthermore, the sample was subjected to Taber's abrasion resistance test involving 100 revolutions at a load of 500 g using abrasion rings, CS-10F of Calibrase. The difference ΔH % between the haze value after this abrasion resistance test and the haze value before this test was measured to evaluate the abrasion resistance.

The results of evaluation are shown in Table 2. The surface resistivity of the biaxially stretched polyethylene terephthalate film as the base was in excess of $10^{16}$ Ω, and its abrasion resistance was 28.5%.

TABLE 2

|  | Surface resistivity (Ω) | Transparency (H %) | Abrasion resistance (ΔH %) |
|---|---|---|---|
| Ex. 1 | 6.8 × 10$^8$ | 3.8 | 5.8 |
|  | 7.9 × 10$^8$ | 4.0 | 5.8 |
|  | 8.3 × 10$^9$ | 4.4 | 6.2 |
| Ex. 2 | 1.5 × 10$^9$ | 3.5 | 4.8 |
|  | 1.0 × 10$^9$ | 3.3 | 4.7 |
|  | 8.8 × 10$^9$ | 3.8 | 5.3 |
| Ex. 3 | 8.5 × 10$^8$ | 3.4 | 6.2 |
|  | 7.5 × 10$^8$ | 3.3 | 6.4 |
|  | 8.4 × 10$^9$ | 3.5 | 6.8 |
| Ex. 4 | 9.1 × 10$^8$ | 3.2 | 4.8 |

TABLE 1

Components and proportions blended (parts)

|  | Polymer* |  | Polyfunctional acrylate |  | Photopolymerization initiator |  | Solvent |  |
|---|---|---|---|---|---|---|---|---|
| Ex. 1 | I | 10.3(3.5) | DPHA | 31.5 | Irgacure 184 | 0.7 | IPA | 57.5 |
| Ex. 2 | I | 5.2(1.8) | DPHA | 33.2 | Irgacure 184 | 0.7 | IPA | 60.9 |
| Ex. 3 | I | 5.2(1.8) | PETA | 33.2 | Irgacure 184 | 0.7 | IPA | 60.9 |
| Ex. 4 | I | 10.3(3.5) | VII | 48.5(31.5) | Irgacure 184 | 0.7 | IPA | 40.5 |
| Ex. 5 | II | 10.0(3.5) | DPHA | 31.5 | Irgacure 184 | 0.7 | IPA | 57.8 |
| Ex. 6 | III | 15.9(3.5) | DPHA | 31.5 | Irgacure 184 | 0.7 | IPA | 51.9 |
| Ex. 7 | IV | 12.5(3.5) | DPHA | 31.5 | Irgacure 184 | 0.7 | IPA | 55.3 |
| Ex. 8 | IV | 25.0(7.0) | DPHA | 28.0 | Irgacure 184 | 0.7 | IPA | 46.3 |
| Ex. 9 | IV | 12.5(3.5) | TMPTA | 31.5 | Irgacure 184 | 0.7 | IPA | 55.3 |
| Ex. 10 | IV | 12.5(3.5) | VII | 48.5(31.5) | Irgacure 184 | 0.7 | IPA | 38.3 |
| Comp. Ex. 1 | V | 10.3(3.5) | DPHA | 31.5 | Irgacure 184 | 0.7 | IPA | 57.5 |
| Comp. Ex. 2 | VI | 8.8(3.5) | DPHA | 31.5 | Irgacure 184 | 0.7 | IPA | 59.0 |

*The values in parentheses ( ) represent the solids contents.
DPHA: Dipentaerythritol hexaacrylate
PETA: Pentaerythritol triacrylate
TMPTA: Trimethylolpropane triacrylate
Irgacure 184: 1-Hydroxycyclohexyl phenyl ketone
IPA: Isopropyl alcohol
I to VII: See the Synthesis Examples 1 to 7.

TABLE 2-continued

|  | Surface resistivity (Ω) | Transparency (H %) | Abrasion resistance (ΔH %) |
|---|---|---|---|
|  | 9.4 × 10⁸ | 3.2 | 5.0 |
|  | 9.5 × 10⁹ | 3.5 | 5.0 |
| Ex. 5 | 4.5 × 10⁸ | 4.5 | 6.0 |
|  | 4.8 × 10⁸ | 4.4 | 6.5 |
|  | 5.8 × 10⁹ | 5.2 | 7.2 |
| Ex. 6 | 6.8 × 10⁸ | 3.8 | 5.4 |
|  | 6.5 × 10⁸ | 3.5 | 5.6 |
|  | 7.7 × 10⁸ | 4.4 | 6.4 |
| Ex. 7 | 5.3 × 10⁸ | 3.5 | 4.9 |
|  | 4.2 × 10⁸ | 3.8 | 5.0 |
|  | 5.8 × 10⁸ | 4.2 | 5.7 |
| Ex. 8 | 3.5 × 10⁸ | 3.7 | 8.2 |
|  | 2.8 × 10⁸ | 3.9 | 8.0 |
|  | 5.2 × 10⁸ | 4.4 | 8.4 |
| Ex. 9 | 4.2 × 10⁸ | 3.3 | 6.5 |
|  | 3.6 × 10⁸ | 3.5 | 6.8 |
|  | 6.1 × 10⁸ | 3.5 | 6.7 |
| Ex. 10 | 7.8 × 10⁸ | 3.0 | 5.0 |
|  | 7.4 × 10⁸ | 3.2 | 4.8 |
|  | 9.1 × 10⁸ | 3.2 | 5.1 |
| Comp. Ex. 1 | 3.3 × 10¹¹ | 8.8 | 4.8 |
|  | 3.8 × 10¹¹ | 7.5 | 4.2 |
|  | 6.1 × 10¹² | 10.5 | 7.3 |
| Comp. Ex. 2 | >10¹⁶ | 3.1 | 4.6 |
|  | >10¹⁶ | 3.1 | 4.8 |
|  | >10¹⁸ | 3.2 | 4.6 |

In each example:
Top row: Initially after curing
Middle row: After wet heat resistance test (80° C., relative humidity 90%, 120 hours)
Bottom row: After water resistance test (immersion for 30 minutes in flowing water of 50° C.)

What is claimed is:

1. An activation energy beam curable coating composition containing (A) a polymer having an organopolysiloxane unit and a quaternary ammonium salt unit and (B) a polyfunctional acrylate having 3 or more acryloyl groups in the molecule.

2. The activation energy beam curable coating composition according to claim 1, wherein the polymer (A) is a polymer having a (meth)acryloyl group in a side chain thereof.

3. The activation energy beam curable coating composition according to claim 1, wherein the polymer (A) is selected from the group consisting of:
a polymer which is prepared by copolymerizing (a1) an organopolysiloxane compound having either one radical polymerizable group in one molecule, or two mercapto groups in one molecule, (a2) a tertiary amine compound having one radical polymerizable group in one molecule, and if desired, (a3) a (meth)acrylic ester to obtain a tertiary amine polymer compounds, and then reacting the tertiary amine polymer compound with a quaternizing agent to obtain a quaternary ammonium salt;
a polymer which is prepared by copolymerizing (a1) an organopolysiloxane compound having either one radical polymerizable group in one molecule, or two mercapto groups in one molecule, (a4) a quaternary ammonium salt having one radical polymerizable group in one molecule, and if desired, (a3) a (meth)acrylic ester;
a polymer which is prepared by copolymerizing (a1) an organopolysiloxane compound having either one radical polymerizable group in one molecule, or two mercapto groups in one molecule, (a2) a tertiary amine compound having one radical polymerizable group in one molecule, and (a3) a (meth)acrylic ester having a functional group to obtain a copolymer, addition-reacting a compound having a (meth)acryloyl group with the copolymer to obtain a tertiary amine polymer compound, and then reacting the tertiary amine polymer compound with a quaternizing agent to obtain a quaternary ammonium salt; and
a polymer which is prepared by copolymerizing (a1) an organopolysiloxane compound having either one radical polymerizable group in one molecule, or two mercapto groups in one molecule, (a4) a quaternary ammonium salt having one radical polymerizable group in one molecule, and a (meth)acrylic ester having a functional group to obtain a copolymer, and then addition-reacting a compound having a (meth)acryloyl group with the copolymer.

4. The activation energy beam curable coating composition according to claim 3, which has 1 to 40% by weight of the organopolysiloxane compound (a1) and 60 to 99% by weight of the tertiary amine compound (a2) or quaternary ammonium salt (a4) in 100% by weight of the copolymerizable monomers.

5. The activation energy beam curable coating composition according to claim 4, which has 5 to 30% by weight of the organopolysiloxane compound (a1) and 70 to 95% by weight of the tertiary amine compound (a2) or quaternary ammonium salt (a4) in 100% by weight of the copolymerizable monomers.

6. The activation energy beam curable coating composition according to claim 3, wherein the organopolysiloxane compound (a1) is a compound having a structure expressed by the general formula (I):

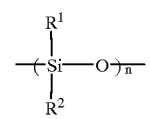

(I)

where $R^1$ and $R^2$ may be the same or different, and each represent a methyl group or a phenyl group, and n denotes an integer of 5 or more.

7. The activation energy beam curable coating composition according to claim 6, wherein the organopolysiloxane compound (a1) is a compound having a number average molecular weight of 400 to 60,000.

8. The activation energy beam curable coating composition according to claim 3, wherein the tertiary amine compound (a2) is a compound having a structure expressed by the general formula (II):

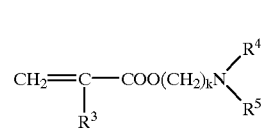

(II)

where $R^3$ represents H or $CH_3$, $R^4$ and $R^5$ each represent H or a $C_{1-9}$ alkyl group optionally containing a substituent, and k denotes an integer of 1 to 6.

9. The activation energy beam curable coating composition according to claim 3, wherein the quaternizing agent is an alkyl chloride.

10. The activation energy beam curable coating composition according to claim 1, wherein the polyfunctional acrylate (B) is selected from the group consisting of trimethylolpropane triacrylate, ethylene oxide modified trimethylolpropane triacrylate, propylene oxide modified trimethylolpropane triacrylate, tris(acryloxyethyl) isocyanurate, caprolactone modified tris(acryloxyethyl) isocyanurate, pentaerythritol triacrylate, pentaerythritol tetraacrylate, dipentaerythritol tetraacrylate, dipentaerythritol pentaacrylate, dipentaerythritol hexaacrylate, alkyl modified dipentaerythritol triacrylate, alkyl modified dipentaerythritol tetraacrylate, alkyl modified dipentaerythritol pentaacrylate, caprolactone modified dipentaerythritol hexaacrylate, and a carboxyl group-containing polyfunctional acrylate obtained by reacting a tetracarboxylic acid dianhydride with a hydroxyl group-containing polyfunctional acrylate having a hydroxyl group and 3 or more acryloyl groups in the molecule.

11. The activation energy beam curable coating composition according to claim 10, wherein the polyfunctional acrylate (B) is selected from the group consisting of dipentaerythritol hexaacrylate, dipentaerythritol pentaacrylate, and a carboxyl group-containing polyfunctional acrylate obtained by reacting a tetracarboxylic acid dianhydride with a hydroxyl group-containing polyfunctional acrylate having a hydroxyl group and 3 or more acryloyl groups in the molecule.

12. The activation energy beam curable coating composition according to claim 1, further containing a polymerizable monomer (C) other than the polymer (A) and the polyfunctional acrylate (B).

13. The activation energy beam curable coating composition according to claim 12, wherein the polymerizable monomer (C) is an acrylate having 1 or 2 acryloyl groups in the molecule.

14. The activation energy beam curable coating composition according to claim 1, further containing a photopolymerization initiator (D).

15. The activation energy beam curable coating composition according to claim 1, containing 1 to 40% by weight of the polymer (A), 60 to 99% by weight of the polyfunctional acrylate (b), 0 to 20% by weight of a polymerizable monomer (C) other than the polymer (A) and the polyfunctional acrylate (B), and 0 to 10% by weight of a photopolymerization initiator (D).

16. The activation energy beam curable coating composition according to claim 15, containing 5 to 25% by weight of the polymer (A), 75 to 95% by weight of the polyfunctional acrylate (B), 3 to 10% by weight of the polymerizable monomer (C), and 1 to 5% by weight of the photopolymerization initiator (D).

17. The activation energy beam curable coating composition according to claim 1, further containing one or more additives selected from the group consisting of an ultraviolet absorber, an ultraviolet stabilizer, an antioxidant, an antiblocking agent, a slipping agent, and a leveling agent.

18. The activation energy beam curable coating composition according to claim 17, containing 0.01 to 2% by weight of the additive.

19. A material having a cured film which can be formed by applying the activation energy beam curable coating composition claimed in claim 1 to the surface of the material, and irradiating the coated surface with an activation energy beam.

20. The activation energy beam curable coating composition according to claim 3, wherein the quaternary ammonium salt (a4) is the quaternization product of a compound having a structure expressed by the general formula (II):

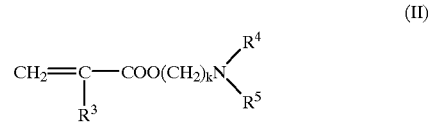

(II)

* * * * *